Figure 1:

CLOSED CELL STRUCTURE

OPEN CELL STRUCTURE

United States Patent Office 2,789,095
Patented Apr. 16, 1957

2,789,095
PROCESS FOR PREPARING UREA-FORMALDEHYDE SOLID FOAM

Philip E. Lindvig, Wilmington, Del., assignor to E. I. du Pont de Nemours and Company, Wilmington, Del., a corporation of Delaware Application November 22, 1952, Serial No. 322,051

7 Claims. (Cl. 260—2.5)

This invention relates to novel urea-formaldehyde resin solid foams having a closed cell structure.

The manufacture of solid foams from thermosetting resins has become a rather well-developed art in recent years. These foams have been used as acoustic and insulating compositions, and for a wide variety of miscellaneous applications. The urea-formaldehyde foams which have been produced commercially heretofore have been relatively fragile and have generally had an open cell structure with relatively few closed cells. Such a predominantly open cell structure is produced by dispersing gas throughout a mixture containing the uncured resin, followed by curing the resin. Numerous devices have been employed to achieve this result. For example, in one device the uncured resin is injected, with stirring, into a reaction vessel containing an acidic liquid foam, prepared by whipping air into water containing a surface active agent and an acid (cf. U. S. 2,076,295, 2,273,367, and 2,559,891); the resin is cured while distributed throughout the said liquid foam. Another procedure has been to dissolve gas under pressure in an uncured urea-formaldehyde-containing liquid, and to cure the urea-formaldehyde resin while releasing the pressure abruptly, thus producing a foam. A common practice has been to include a blowing agent, such as an azide, in the resin mixture during molding, such blowing agents being capable of generating gas at the molding and curing temperature. Still another procedure has been to pump air through a suitable sparger into a liquid composed of water, surface-active agent, uncured resin, and curing catalyst. Recently a process for preparing urea-formaldehyde closed-cell foams has been proposed (Shackleton, Industrial Chemist, December 1949, pp. 566–572). In that process the expansion of the resin is not brought about by gas bubbles, but mainly by emulsified globules of organic liquid, which can be removed after cell-formation by evaporation through porous cell walls.

The prior art solid urea-formaldehyde foams other than those described by Shackleton have been relatively impervious to moisture although on prolonged immersion they absorbed substantial quantities of water; for example, one such product had a density of 2 pounds per cubic foot, and absorbed three times its weight of water after 24 hours immersion in water under 4 pounds per square inch head (cf. U. S. 2,432,389).

The present invention is directed to an improved process for preparing solid urea-formaldehyde foams which, like those of Shackleton, appear to have a predominantly closed cell structure when viewed under the microscope, as illustrated in the drawing (Figure 1) accompanying this application. It is to be noted that in the solid foams of this invention, the "closed cells," constituting the structure of the foam, contain microscopic or submicroscopic pores or openings which permit fluid to penetrate or permeate into the individual cells at a relatively rapid rate, and this permeation or penetration of fluid into the internal structure of the foam opens up a new range of utility for urea-formaldehyde foams. The tendency of fluids to permeate these cells is accelerated by the capillary action of the solid surfaces upon the said fluid. Specific additives in the solid structure, as disclosed in copending U. S. patent application S. N. 322,153, filed November 22, 1952, accelerate even further this capillary action. As explained below in greater detail, the phenomenon of accelerated loading of such cellular structures with fluid has numerous practical applications.

An object of the invention is to provide a relatively simple and efficient process for preparing urea-formaldehyde solid foams having the structure described above. Another object of the invention is to provide urea-formaldehyde solid foams having relatively low frangibility and having a high capacity and absorption of fluids which after absorption are retained within the foam cells. Other objects of the invention will appear hereinafter.

In accordance with the present invention, a process is provided for preparing urea-formaldehyde foams having a predominantly closed cell structure which involves the following steps: (1) dispersing a low boiling water-insoluble liquid such as propane (under pressure), ethyl chloride, butenes, butane, pentane, dichlorotetrafluoroethane or trichloromonofluoromethane in an aqueous urea-formaldehyde resin solution in the presence of a surface-active agent to produce a stable emulsion; (2) mixing the said emulsion with an acidic or acid-yielding urea-formaldehyde-curing catalyst such as phosphoric acid, sulfur dioxide, formic acid; (3) causing the resin to expand by raising the temperature or reducing the pressure; (4) curing the urea-formaldehyde resin, and (5) removing any remaining low boiling liquid and other ingredients of the liquid phase from the cured product by evaporation or by any other suitable process. This process differs from the prior art emulsion process in that the globules of liquid are dispersed in a relatively viscous resin phase, and the said globules expand due to gasification. The resulting bubble of vapor is surrounded by partially cured resin at such a stage of cure that it does not collapse, but ultimately hardens further to form a solid foam.

The liquid viscous urea-formaldehyde aqueous composition which is employed in the practice of this invention should preferably have a urea-formaldehyde concentration of about 50% to 90% by weight, excellent results being obtained at a resin solids content of about 75%. The viscosity of the urea-formaldehyde aqueous liquid should be about 200 cps. to 10,000 cps. preferably about 1,000 cps. In general the mol ratio of formaldehyde to urea in the urea-formaldehyde composition should be within the range of 1.4:1 to 2.5:1, excellent results being obtained when this formaldehyde-urea ratio is from 1.6:1 to 2.0:1.

The blowing agent must be a readily vaporizable water-insoluble inert liquid, best results being obtained with substances which are normally gaseous but which are liquid under the conditions of preparing the emulsion. The quantity of blowing agent can be varied rather widely and it is to be understood that the density of the foam depends upon the quantity of blowing agent employed. A suitable quantity of blowing agent is about .02 to .30 part by weight per unit weight of resin solids.

Any suitable emulsifying agent may be employed to disperse the gas in the viscous urea-formaldehyde aqueous liquid. Suitable emulsifying agents include dioctyl esters of sodium sulfosuccinic acids, sulfates of fatty acid monoglycerides, fatty alcohol sulfates, sodium alkyl aryl sulfonates, sorbitan monolaurates, polyoxyethylene ethers of palmitic acid, etc. The emulsion of the low-boiling liquid in the urea-formaldehyde liquid containing such an emulsifying agent can be prepared by simply mixing the low-boiling liquid with the aqueous liquid containing the urea-formaldehyde and emulsifying agent, and agitating the resulting mixture gently to produce the desired emulsifying action. During this mixing the temperature must be kept below the boiling point of the low-boiling liquid and, of course, above the freezing point of the liquid medium. (*Note*.—The freezing point of the preferred urea-formaldehyde compositions is about −10° C.) The mixing may be done at a superatmospheric pressure greater than the vapor pressure of the blowing agent at ordinary room temperature, or at the prevailing temperature. The acidic catalyst is introduced into the mixture immediately before curing. During this stage of the process, the temperature is permitted to rise to a curing temperature within the range of 15° to 115° C., preferably a temperature somewhat above the boiling point of the blowing agent. The quantity of acid catalyst preferably is sufficient to produce a pH of about 2.5 to 4.5. In the case of phosphoric acid catalyst, this corresponds with about 0.5 to 4.0% of added catalyst, based on the total weight of the mixture. If desired the curing process can be carried out in a retaining vessel or mold but this is not absolutely essential since it is also possible to carry out the curing process after shaping the uncured foam on laths, cloth, or other supporting means. When a receptacle is employed for the purpose of shaping the foam during curing the size of the receptacle should be large enough to contain not only the liquid and solid ingredients, but also at least about half of the quantity of blowing agent in the form of gas. In other words, the efficiency of the blowing agent is frequently of the order of magnitude of about 50%.

Figure 2:

In the drawings presented herewith, Figure 1 represents a photograph of the closed cell structure obtained by the method of this invention. By way of comparison, Figure 2 shows the open cell structure containing relatively few closed cells, produced in accordance with prior art processes.

The invention is illustrated further by means of the following example.

*Example*

To a viscous aqueous urea-formaldehyde resin solution having a formaldehyde-urea mol ratio of 1.8 and a viscosity of 400 centipoises, prepared by the method described in Serial No. 263,520, filed December 26, 1951, now U. S. Patent No. 2,625,524, issued January 13, 1953, was added 1% (based on the weight of the resin solids) by weight of "Aresklene" 375 (dibutyl phenyl phenol sodium disulfonate) emulsifying agent. The resulting mixture was cooled to 0° C. and 25% by weight (based on the weight of resin solids) of dichlorotetrafluoroethane was introduced with gentle agitation. In this manner, an emulsion was produced which remained stable at 0° C. Into this emulsion was stirred thoroughly 1% (based on the weight of resin solids) of 85% $H_3PO_4$. The resulting emulsion was immediately poured on a frame at room temperature whereby it expanded and hardened to produce a layer of cured urea-formaldehyde solid foam. This foam, viewed under the microscope, had the structure shown in Figure 1 of the drawing attached to this application.

The foams obtained as above described, especially after being crushed, have the capacity of soaking up liquid substances, such as water, acetone, alcohols, etc. This sponge-lke property is of value in many ways, and particularly in modifying the properties (strength, etc.) of the foam, because solutions of dissolved resins such as polymethyl methacrylate in acetone or other volatile solvent can be absorbed by the foam, after which the acetone can be removed by evaporation to produce a urea-formaldehyde solid foam having the cell surfaces coated with methyl methacrylate polymer. Somewhat similar effects can be obtained by dissolving a soluble resin in the blowing agent prior to carrying out the expansion step.

The viscosity of the urea-formaldehyde aqueous liquid employed in practicing this invention can be controlled within the desired range by methods hereinabove mentioned or by controlled addition of thickening agents, such as "Kelgin" seaweed extract, etc.

It is to be understood that the present invention has a wide variety of applications especially in connection with the processes requiring a strong light-weight urea-formaldehyde foam. The fields of use of such foams include the manufacture of acoustic and insulating structures as well as in various display applications. Other uses for which the foams obtained by the process of this invention are especially well adapted include the construction of temporary dams and like structures which may be used to bring about the accumulation of soil behind the foam structure and thus provide an effective means for flood or drainage control. An advantage in the use of urea-formaldehyde foams in this way resides in the fact that the foams can be plowed into the soil with ease after the soil has collected behind the dam and has served its purpose. The foams are of outstanding value in the chromatographic separation of mixtures; ordinary ink, when absorbed into certain of these foams separates into strata of its variously colored ingredients.

It will be understood, of course, that there are numerous other applications for the urea-formaldehyde foams which are obtained in accordance with the process of this invention.

I claim:

1. A process for preparing a solid urea-formaldehyde foam which comprises emulsifying an inert organic water-insoluble liquid in an aqueous urea-formaldehyde solution having a viscosity within the range of 200 to 10,000 centipoises, the quantity of said liquid being from 0.02 to 0.30 part by weight per unit weight of urea-formaldehyde, said emulsification being carried out in the presence of an emulsifying agent, mixing the resulting emulsion at a temperature below the vaporization temperature of said liquid with an acidic urea-formaldehyde-curing catalyst, whereby curing of the urea-formaldehyde commences, thereupon heating the mixture to produce vaporization of the said liquid, and subjecting the resultant mixture, made up of cells containing the said vapors, to the hardening action of said acid-curing catalyst by maintaining the mixture at a curing temperature above the boiling point of the said inert organic liquid, said curing temperature being within the range of 15° to 115° C. whereby a solid foam of substantially closed cell structure is obtained.

2. Process of claim 1 in which the said low boiling organic liquid is dichlorotetrafluoroethane.

3. Process of claim 1 in which the said low boiling organic liquid is butane.

4. Process of claim 1 in which the acid-curing catalyst is phosphoric acid.

5. Process of claim 1 in which the acid-curing catalyst is formic acid.

6. Process of claim 1 in which the mol ratio of formaldehyde-urea is within the range of 1.4:1 to 2.5:1.

7. Process of claim 1 in which the formaldehyde-urea mol ratio is 1.8:1.

References Cited in the file of this patent

UNITED STATES PATENTS

| | | |
|---|---|---|
| 2,283,604 | Harrison et al. | May 19, 1942 |
| 2,387,730 | Alderson | Oct. 30, 1945 |

FOREIGN PATENTS

| | | |
|---|---|---|
| 578,838 | Great Britain | July 15, 1946 |
| 586,199 | Great Britain | Mar. 11, 1947 |

OTHER REFERENCES

Shackleton: The Industrial Chemist (England), December 1949, pages 566–572.